Patented May 13, 1924.

1,493,685

UNITED STATES PATENT OFFICE.

ERNEST E. LINDSEY AND PATRICK J. SHORTT, OF SAN FRANCISCO, CALIFORNIA.

COMPOUND FOR BREAD MAKING.

No Drawing.   Application filed May 14, 1923. Serial No. 638,951.

*To all whom it may concern:*

Be it known that we, ERNEST E. LINDSEY and PATRICK J. SHORTT, citizens of the United States, residing at the city and county of San Francisco and State of California, have invented new and useful Improvements in Compounds for Bread Making, of which the following is a specification.

This invention relates to a compound for use in bread making.

In commercial bakeries the various components of the bread dough are usually mixed together initially in the presence of the flour and yeast, and, as a consequence, they are not as thoroughly combined and distributed as they should be. This results in imperfect fermentation, requires an extra amount of yeast and produces a bread of poor texture, color and flavor as compared with bread made in the home. Furthermore, the different batches of bread vary considerably in quality, due to the inaccurate measurement of the ingredients at the time of mixing.

In and by the present invention we produce a compound containing all of the important components of bread dough, except flour and yeast, combined and mixed in the proper proportions and so treated as to bring about improved chemical changes which would not take place if these components were initially brought together and mixed in the presence of the yeast and flour. This compound can be prepared in large quantities and kept indefinitely. By supplying it to bakers the work of the latter is reduced, the quality of the bread is greatly improved and standardized and a saving is effected in yeast and a larger yield of bread is produced from a given amount of flour.

A preferred manner of producing our compound is as follows:

The following ingredients in the approximate proportions mentioned are brought together and mixed: Starch, 20 pounds; malt, 4 pounds; sugar, 25 pounds; fat, 25 pounds; salt, 20 pounds; powdered buttermilk, 5 pounds; gelatine, 1 pound. The different proportions form a mass of 100 pounds and to this is added approximately 120 pounds of water. The mixture is then raised to a temperature of approximately 212° F. and for a period of approximately twenty minutes and thereafter cooled.

The final product is of a bluish white color and about the consistency of ordinary jelly. To make bread from this compound the baker simply adds the required amount of flour, yeast and water. For bread making 30 pounds of compound is used to each barrel of flour.

By so compounding the above ingredients certain improved chemical actions occur which manifest themselves in various ways, such as reduction in quantity of yeast required to bring about proper fermentation of the dough, a shortening of the period of fermentation by three or four hours, stabilization of fermentation and production of a bread of close and even texture having the capability of retaining moisture for long periods of time.

This compound eliminates the necessity on the part of the baker of weighing and measuring a great number of the important ingredients of the bread dough, thus lessening the chance of spoiled batches due to errors on the part of the baker and insuring uniform quality of bread at all times. As the result of the perfect distribution of the ingredients in the dough through the use of this compound a more stable and even fermentation is obtained and the diastatic power of the yeast is accelerated and made to act uniformly throughout the mixture. Thereby the gluten is rendered evenly tenacious and produces gas cells of uniform size at the time of baking. The bread so produced has a close and even texture and hence gives off less moisture, making it possible for the bread to retain its freshness for a period of several days.

This compound will impart the desired whiteness to the bread, thus making it unnecessary for the baker to resort to the blending of flours as at present. Many bakers, in order to produce a whiter loaf, have blended with the stronger and darker flours a soft patent flour. This practice results in an uneven fermentation, due to the difference in the granulation and characteristics of the gluten in the different grades of flour.

We further find that for a given amount of flour a larger yield of bread is obtained where this compound is used.

Various changes in the proportions and characteristices of the ingredients employed in producing our compound may be resorted to without departing from the spirit of our invention as disclosed in the appended claims.

By the term cooked as used in the claims, is meant the subjection of the mixture to a temperature of approximately 212° F. for a sufficient period of time to bring about an explosion of the starch cells and to produce a gelatinized mixture.

Having thus described our invention, what we claim and desire to secure by Letters Patent is:

1. A cooked compound for bread making in the form of a jelly like substance consisting of the shortening, sweetening and seasoning components of the bread dough and a suitable thickener.

2. A cooked compound for bread making in the form of a jelly like substance consisting of the shortening, sweetening and seasoning components of the bread dough, and starch.

3. The process of making a compound for use in bread making which consists of first mixing together the principal components of the bread dough, except yeast and flour, and cooking the same at a temperature sufficiently high and for a period of time long enough to produce a jelly like substance.

4. A cooked compound for bread making in the form of a jelly like substance consisting of the starch, sugar, shortening, salt and milk components of bread dough.

5. A cooked compound for bread making in the form of a jelly like substance consisting of the starch, sugar, shortening, malt, salt and milk components of bread dough.

6. A process of producing a compound for bread making purposes which consists of mixing the following ingredients in the approximate proportions mentioned; starch 10%; sugar $12\frac{1}{2}$%, fat $12\frac{1}{2}$%, malt 2%, gelatine $\frac{1}{2}$%; salt 10%; powdered buttermilk $2\frac{1}{2}$% and water 50%, and cooking the same at a temperature of approximately 212° F. and for a period of approximately twenty minutes.

ERNEST E. LINDSEY.
PATRICK J. SHORTT.